United States Patent
Hommeltoft (10) Patent No.: US 12,486,461 B2
(45) Date of Patent: Dec. 2, 2025

(54) FIXED BED LIPID CONVERSION WITH CATALYST REGENERATION

(71) Applicant: Chevron U.S.A. Inc., San Ramon, CA (US)

(72) Inventor: Sven Ivar Hommeltoft, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 530 days.

(21) Appl. No.: 18/149,087

(22) Filed: Dec. 31, 2022

(65) Prior Publication Data

US 2024/0218261 A1 Jul. 4, 2024

(51) Int. Cl.
  *C10G 3/00* (2006.01)
  *B01J 8/02* (2006.01)

(52) U.S. Cl.
  CPC ............... *C10G 3/50* (2013.01); *B01J 8/025* (2013.01); *C10G 3/48* (2013.01); *C10G 2300/1014* (2013.01); *C10G 2400/04* (2013.01)

(58) Field of Classification Search
  CPC ... C10G 3/50; C10G 3/48; C10G 3/00; C10G 3/42; C10G 3/62; C10G 3/47; C10G 3/44; C10G 2300/1014; C10G 2400/04; C10G 2400/02; C10G 2400/00; B01J 8/025; B01J 8/0278; B01J 8/0285; B01J 8/0453; Y02P 30/20; Y02P 20/52
  See application file for complete search history.

(56) References Cited

U.S. PATENT DOCUMENTS

| | | | |
|---|---|---|---|
| 9,476,066 B2 * | 10/2016 | Foody | C12P 7/10 |
| 10,988,708 B2 * | 4/2021 | Blanchard | B01J 3/008 |
| 11,248,182 B1 * | 2/2022 | Kurukchi | C02F 1/20 |
| 11,434,509 B2 * | 9/2022 | Foody | C10L 1/04 |
| 2008/0027263 A1 | 1/2008 | D'Amico | |
| 2011/0047866 A1 * | 3/2011 | Bao | C10G 45/08 44/605 |
| 2011/0100359 A1 | 5/2011 | North | |
| 2014/0163285 A1 | 6/2014 | Buchanan | |
| 2016/0168491 A1 * | 6/2016 | Yao | C10G 50/00 585/256 |
| 2022/0041938 A1 | 2/2022 | Hommeltoft | |

FOREIGN PATENT DOCUMENTS

WO WO 2008/152199 A1 12/2008

OTHER PUBLICATIONS

International Search Report and Written Opinion for PCT App. No. PCT/US2023/086209 dated Apr. 26, 2024.
Zhou, et al., "Regeneration of catalysts deactivated by coke deposition: A review," Chinese Journal of Catalysis 41.7, Jul. 1, 2020, 1048-1061.

* cited by examiner

Primary Examiner — Dapinder Singh
(74) Attorney, Agent, or Firm — King & Spalding LLP (57) ABSTRACT

A reactor system includes a fixed bed reactor that treats a lipid feedstock using a metal oxide catalyst to produce a treated stream comprising a bio-oil. The reactor system includes a ketopyrolyis zone in which the metal oxide catalyst reacts with the lipid feedstock to produce the treated stream. The reactor system can operate in a reaction mode, during which the reactor treats the lipid feedstock, and a regeneration mode, during which coke is burned from the metal oxide catalyst.

20 Claims, 3 Drawing Sheets

FIXED BED LIPID CONVERSION WITH CATALYST REGENERATION

TECHNICAL FIELD

Embodiments of the technology relate generally to upgrading compositions that may be used as renewable feedstocks for refinery processing and regeneration of catalysts used in such upgrading.

BACKGROUND

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

Despite the ongoing research and development in the processing of renewable feedstocks and manufacture of fuels, there is still a need to provide an improved process for purifying renewable feedstock to provide purified feedstock, which is suitable for converting to valuable chemicals, such as hydrocarbons suitable as fuels or fuel blending components. In particular, there is a need for reactor systems that can efficiently process such alternative and renewable feedstocks.

SUMMARY

In one example embodiment, the present disclosure is generally directed to a process for treating a lipid feedstock. The process can comprise: a) providing an input of a lipid feedstock comprising at least one fatty acid glycerol ester into a fixed bed reactor operating in a reaction mode, wherein the fixed bed reactor comprises a ketopyrolysis zone disposed above a hydrolysis zone, wherein the ketopyrolysis zone comprises a metal oxide catalyst on an oxide support, and wherein the lipid feedstock enters the fixed bed reactor between the ketopyrolysis zone and the hydrolysis zone; b) providing an input of a superheated steam into the fixed bed reactor, wherein the superheated steam enters the fixed bed reactor below the hydrolysis zone, wherein the superheated steam reacts with the lipid feedstock producing an intermediate lipid gas that flows upward through the ketopyrolysis zone; c) treating the intermediate lipid gas with the metal oxide catalyst in the ketopyrolysis zone under treating conditions to produce a treated stream that is output from the fixed bed reactor; d) switching the fixed bed reactor from the reaction mode to a regeneration mode; e) turning off the input of the lipid feedstock and the input of the superheated steam to the fixed bed reactor; f) providing an input of air to the fixed bed reactor; and g) regenerating the metal oxide catalyst in the ketopyrolysis zone of the fixed bed reactor by removing coke from the metal oxide catalyst using combustion.

In another example embodiment, the present disclosure is generally directed to a reactor system for treating a lipid feedstock. The reactor system can comprise: a) a lipid feedstock inlet that directs a lipid feedstock comprising at least one fatty acid glycerol ester into a fixed bed reactor; b) at least one ketopyrolysis zone disposed within the fixed bed reactor, the at least one ketopyrolysis zone comprising metal oxide catalyst that transforms the lipid feedstock into a treated stream when the fixed bed reactor is operating in a reaction mode; c) a hydrolysis zone disposed within the fixed bed reactor and proximate a bottom portion of the fixed bed reactor, wherein the lipid feedstock inlet is disposed above the hydrolysis zone and below the at least one ketopyrolysis zone; d) a superheated steam inlet that directs superheated steam into the fixed bed reactor, the superheated steam inlet disposed below the hydrolysis zone; e) a treated stream outlet that directs the treated stream from the fixed bed reactor; f) an air inlet that directs air into the fixed bed reactor for regenerating the metal oxide catalyst when the fixed bed reactor is operating in a regeneration mode; and g) a flue gas outlet that directs flue gas from the fixed bed reactor, the flue gas produced during the regenerating of the metal oxide catalyst.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a reactor system and a method for processing a lipid feedstock and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for processing a lipid feedstock. The example apparatus and methods described herein are particularly beneficial in the oil and gas industry where lipid feedstocks can be used in the production of hydrocarbon fluids. As will be described further below, the apparatus and methods described herein utilize a reactor system comprising one or more fixed bed reactors for treating lipid feedstocks to produce a bio-oil renewable feedstock suitable for refinery operations.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Definitions

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylgycerols), diglycerides (diacylglycerols), triglycerides (triacylglycerols, TAGs, or neutral fats); phosphoglycerides (glycerophospholipids); non-glycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing 3 to 39 carbon atoms, more particularly 7 to 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "pyrolysis" refers to the thermal decomposition of organic materials in an oxygen-lean atmosphere (i.e., significantly less oxygen than required for complete combustion). The term "ketopyrolysis" refers to a combined ketonization and pyrolysis process as described further below in connection with the experimental example.

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, but is not limited to, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" means parts-per-million and is a weight relative parameter. A part-per-million is a microgram per gram, such that a component that is present at 10 ppm is present at 10 micrograms of the specific component per 1 gram of the aggregate mixture.

Lipid Feedstock

The lipid feedstocks described herein originate from a renewable or biological source or sources, and the lipid feedstocks are meant to include here feedstocks other than those obtained from mineral oil, shale oil, or coal.

The lipid feedstock may for example comprise 0 to 90 wt. % of free fatty acids, 5 to 100 wt. % fatty acid glycerol esters (e.g., mono-, di-, triglycerides) and 0 to 20 wt. % of one or more compounds selected from the list consisting of: fatty acid esters of the non-glycerol type, fatty amides, and fatty alcohols, where the renewable feedstock comprises more than 50 wt. % of free fatty acids and fatty acid glycerol esters such as 70 wt. % or more, for example 80 wt. % or more.

The lipid feedstock may originate for example from plants, animals, algae (algae oil, algae biomass, algae cultivation), fish and microbiological processes.

Examples of such feedstocks include feedstocks originating from low value renewable waste materials, side streams, by-products, refining waste and residues, sewage sludge, and any combinations thereof.

The lipid feedstock may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

Such lipid feedstocks typically contain varying amounts of impurities, such as phosphorus, silicon, chloride, alkali metals, earth alkaline metals, other metals, etc.

The lipid feedstock may comprise at least 10 ppm (e.g., 10 to 100 ppm, 10 to 75 ppm, 10 to 50 ppm, 15 to 100 ppm, or 15 to 50 ppm) of chlorine, calculated as elemental chlorine (a Cl atom). Chlorine content can be determined using combustion ion chromatography (ClC). Combustion ion chromatography is a technique in which a sample is burned in oxygen-containing gas flow, the gas generated is absorbed in an adsorption solution and then, a halogen ion adsorbed in the adsorption solution is quantitatively analyzed by an ion chromatography method. The technique makes it possible to easily analyze a halogen component in ppm range which has been conventionally difficult.

Lipid feedstocks comprising one or more of alkali metals, alkaline earth metals, and/or other metals, such as iron and manganese, even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof.

The lipid feedstock may comprise at least 1 ppm (e.g., 1 to 250 ppm, 1 to 100 ppm, 1 to 50 ppm, 1 to 25 ppm, 2 to 250 ppm, 2 to 100 ppm, or 2 to 25 ppm) of alkali metals, alkaline earth metals, metals of Groups VIIB and VIIIB, or combinations thereof, calculated as elemental metals, in total. Total metals content can be determined using AOCS Recommended Practice Ca 17-01.

Low value lipid feedstocks, such as various types of animal fats and waste oils, generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

The lipid feedstock may have an acid number of at least 5 mg KOH/g (e.g., 5 to 150 mg KOH/g, 10 to 150 mg KOH/g. 10 to 100 mg KOH/g, 10 to 50 mg KOH/g, from 10 to 25 mg KOH/g, or 10 to 20 mg KOH/g). Acid number can be determined using ASTM D664.

The lipid feedstock may be pretreated. Such pretreatments include, but are not limited to, degumming, neutralization, bleaching, deodorizing, or any combination thereof.

Treatment of the Lipid Feedstock

In order to provide renewable feedstocks suitable for refinery operations, the lipid feedstock is treated with a metal oxide catalyst on an oxide support under treating conditions to produce a treated stream comprising a liquid fraction comprising a bio-oil which has a lower content of free fatty acids and impurities as compared to the renewable feedstock. The obtained bio-oil is particularly suitable as a renewable feedstock for hydroprocessing in biofuel manufacture.

Without being bound by theory, the treating is believed to proceed by a thermochemical process which includes one of more of cracking, decarboxylation, decarboxylation-coupling, dehydration and/or deoxygenation reactions.

Suitable treating conditions may comprise one or more of the following: a temperature in a range of from 400° C. to 700° C. (e.g., 425° C. to 650° C., or 450° C. to 600° C.); a pressure in a range of from 0 to 10 MPa (e.g., 0.1 to 5 MPa, or 0.1 to 1 MPa); and a liquid hourly space velocity (LHSV) in a range of from 0.1 to 10 $h^{-1}$ (e.g., 0.2 to 5 $h^{-1}$, or 0.3 to 3 $h^{-1}$).

The reaction may be carried out in the presence of a carrier gas such as hydrogen, nitrogen, carbon dioxide, $H_2O$ (water vapor) or C1-C4 hydrocarbons (e.g., methane, ethane, propane or mixtures thereof), preferably, $CO_2$ or $H_2O$. These gases may be admixed into the reaction mixture and/or may be formed in the course of the reaction. The carrier gas may be used to expel gaseous or volatile reaction products from the product mixture such as $H_2O$ or $CO_2$.

The reaction is carried out in the presence of a metal oxide catalyst on an oxide support. The metal of the metal oxide may be selected from Na, K, Mg, Ca, Sr, Cr, Mo, Mn, Fe, Co, Ni, Cu, Zn, Al, rare earth metals, or a mixture thereof. The oxide support may be selected from alumina, silica, silica-alumina, titania, zirconia, or a mixture thereof. In some aspects, the metal oxide catalyst comprises CaO, the oxide support being alumina.

The treating may be conducted in any suitable reactor or reactor configuration, such as a fixed bed reactor, a moving bed, a slurry reactor, a fluidized bed reactor, an ebullating bed reactor, a transport bed reactor, a two-phase bed reactor, a riser reactor, and a batch reactor. The feed stream can be flowed over the catalyst bed either up-flow or down-flow in the liquid, vapor, or mixed phase.

The process may be batch-type or semi-batch-type or continuous, suitably a continuous process is used.

The bio-oil has a lower content of oxygen and impurities as compared to the lipid feedstock.

The bio-oil may have a TAN of less than 5 mg KOH/g (e.g., less than 4 mg KOH/g, less than 3 mg KOH/g, less than 2 mg KOH/g, or less than 1 mg KOH/g).

The bio-oil may comprise less than 10 ppm (e.g., less than 5 ppm, less than 1 ppm, or less than 0.5 ppm) of chlorine, calculated as elemental chlorine (a Cl atom).

The bio-oil may comprise less than 1 ppm of alkali metals, alkaline earth metals, metals of the Groups VIIB and VIIIB of the Periodic Table of Elements (other metals), or combinations thereof, calculated as elemental metals, in total, preferably less than 0.5 ppm.

The oxygen content of the bio-oil may be 5 wt. % or less (e.g., 3 wt. % or less, or 2 wt. % or less), on a dry basis, based on the total weight of the bio-oil. Oxygen content can be determined using ASTM D5291. Lipid feedstocks can have an oxygen content in a range of about 10 to 15 wt. %, on a dry basis, based on the total weight of the feedstock.

Hydroprocessing

Beneficially, the bio-oil produced by the process disclosed herein may be used directly as a refinery feedstock.

The obtained bio-oil may be blended with one or more mineral oil feedstocks originating from crude oil, shale oil or coal and likewise used as a refinery feedstock.

If desired, the bio-oil may be subjected to a catalytic hydroprocessing step. The obtained at least one effluent (hydroprocessing product) may be fractionated in a fractionating step to provide hydrocarbon fractions, suitable as renewable fuels or fuel components, useful as transportation fuels, fuel components and other chemicals.

The catalytic hydroprocessing step may be carried out in one step or in more than one steps.

The catalytic hydroprocessing step may be carried out by processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni. Pt and Pd. The catalyst(s) can also contain one or more support materials, for example zeolite, alumina, alumina-silica, zirconia, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from 100° C. to 450° C. (e.g., 200° C. to 370° C., or 230° C. to 350° C.); a pressure of from 0.5 to 30 MPa (e.g., 3 to 25 MPa, or 3 to 12 MPa); a liquid hourly space velocity of from 0.01 to 10 $h^{-1}$ (e.g., 0.1 to 5 $h^{-1}$). The hydrogen gas treat rate can be in a range of from 600 to 4000 $Nm3/m3$ (e.g., 1300 to 2200 $Nm^3/m^3$).

The hydroprocessing occurs in a reaction stage. The reaction stage can comprise one or more reactors or reaction zones each of which comprises one or more catalyst beds of the same or different catalyst. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., C1-C5 hydrocarbons), $H_2S$, CO and $CO_2$ are separated from the liquid component comprising >C5 hydrocarbons and some C1-C5 hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405.

The person skilled in the art is able to vary the distilling conditions and to change the temperature cut point as desired to obtain any suitable hydrocarbon product, boiling suitably in the transportation fuel ranges.

EXAMPLES

The following illustrative examples are intended to be non-limiting.

Example

For the experimental work, a pretreated used cooking oil (UCO) was used as a feed. Though pretreated by conventional lipid pretreatment methods, the feed still contained impurities (see Table 1 below). In particular, the high chloride and residual metals content along with the high total acid number (TAN) of the pretreated UCO are indicative of the challenges that conventional lipid pretreatment have in removing these impurities to a level that makes lipid feedstocks processable in conventional crude oil refining processes.

The UCO was processed in a continuously operated fixed bed bench scale unit over 50 mL of calcium promoted alumina catalyst at atmospheric pressure and at a temperature of 900° F. or 950° F. In one run, the UCO was processed at a reaction temperature of 900° F. without the addition of water. In the second run, 22 g/h of water was co-fed with the UCO to the reactor operating at 950° F. The chemical and physical properties of the feed and liquid products are summarized in Table 1. Simulated distillation (SIMDIS) was determined according to ASTM D2887.

Chloride content is reported in ppm chlorine by weight of the composition and is determined by combustion ion chromatography. A known weight of sample is placed into a quartz sample boat and introduced into a high temperature combustion tube. The sample is combusted (1050° C.) in an oxygen-rich pyrohydrolytic environment and captures the combustion products in dilute hydrogen peroxide (absorbing solution). The resulting solution is analyzed by Ion Chromatography (IC). Chloride ion is separated from other anions after passing through the analytical column. The conductivity of the eluent is reduced with a suppressor prior to the conductivity detector, where the anion of interest (Cl—) is measured. A set of chloride calibration standards containing known mass of chloride is used to quantify the chloride in the original combusted sample. Samples containing 1 to 100 ppm can be analyzed using this method. Combustion ion chromatography was carried out on a Metrohm Combustion IC to determine the chlorine content.

TABLE 1

Ketopyrolysis of UCO Over Calcium Promoted Alumina

|  | UCO Feed | Run 1 | Run 2 |
|---|---|---|---|
| Conditions | | | |
| Temperature, ° F. | — | 900 | 950 |
| Pressure, atm | — | 1 | 1 |
| Flow, g/h | — | 38 | 39 |
| LHSV, h$^{-1}$ | — | 0.82 | 0.85 |
| Water flow, g/h | — | — | 22 |
| Properties | | | |
| TAN, mg KOH/g | 20 | 0.95 | 1.03 |
| C, wt. % | 77.06 | 85.61 | 85.9 |
| H, wt. % | 11.3 | 12.44 | 12.21 |
| N, wt. % | <1 | <1 | <1 |
| O, wt. % | 11.64 | 1.95 | 1.89 |
| Cl, ppm | 16 | <1 | <1 |
| Na, ppm | 2.04 | <0.21 | <0.28 |
| Ca, ppm | 0.22 | <0.11 | <0.11 |
| Si, ppm | 0.72 | <0.21 | <0.21 |
| SIMDIS, ° F. | | | |
| 0.5 wt. % | 644 | 83 | 298 |
| 5 wt. % | 686 | 178 | 302 |
| 10 wt. % | 778 | 230 | 308 |
| 30 wt. % | 1107 | 371 | 355 |
| 50 wt. % | 1123 | 483 | 436 |
| 70 wt. % | 1129 | 580 | 534 |
| 90 wt. % | 1143 | 749 | 673 |
| 95 wt. % | 1152 | 815 | 744 |
| 99.5 wt. % | 1226 | 981 | 920 |

As shown in Table 1, the liquid products from Runs 1-2 had significantly reduced TAN and chloride and residual metals content compared to the UCO feed.

Elemental analysis shows that the oxygen content in the liquid products from Runs 1-2 is lower than what a ketonization reaction alone would be expected to yield. Moreover, SIMDIS shows that >95% of the liquid products from Runs 1-2 are lower boiling than ketone dimers would be expected to have and at least 60% of the liquid products from Runs 1-2 are lighter than would be expected for a fatty acid unit alone. While not being bound by theory, it is believed that the observed liquid product distribution is not consistent with the composition undergoing a ketonization process exclusively and may be more consistent with a combined ketonization and pyrolysis process (i.e., a "ketopyrolysis" process).

The Reactor System

As described above, in order to provide renewable feedstocks of bio-oils suitable for refinery operations, the lipid feedstock is treated with a metal oxide catalyst to produce a treated stream. The treated stream can be condensed and fractionated into a gas fraction and a liquid fraction, wherein the liquid fraction comprises water and a bio-oil suitable for use as a renewable feedstock for hydroprocessing. Example reactor systems for treating lipid feedstocks will now be described in greater detail.

Figure 1:
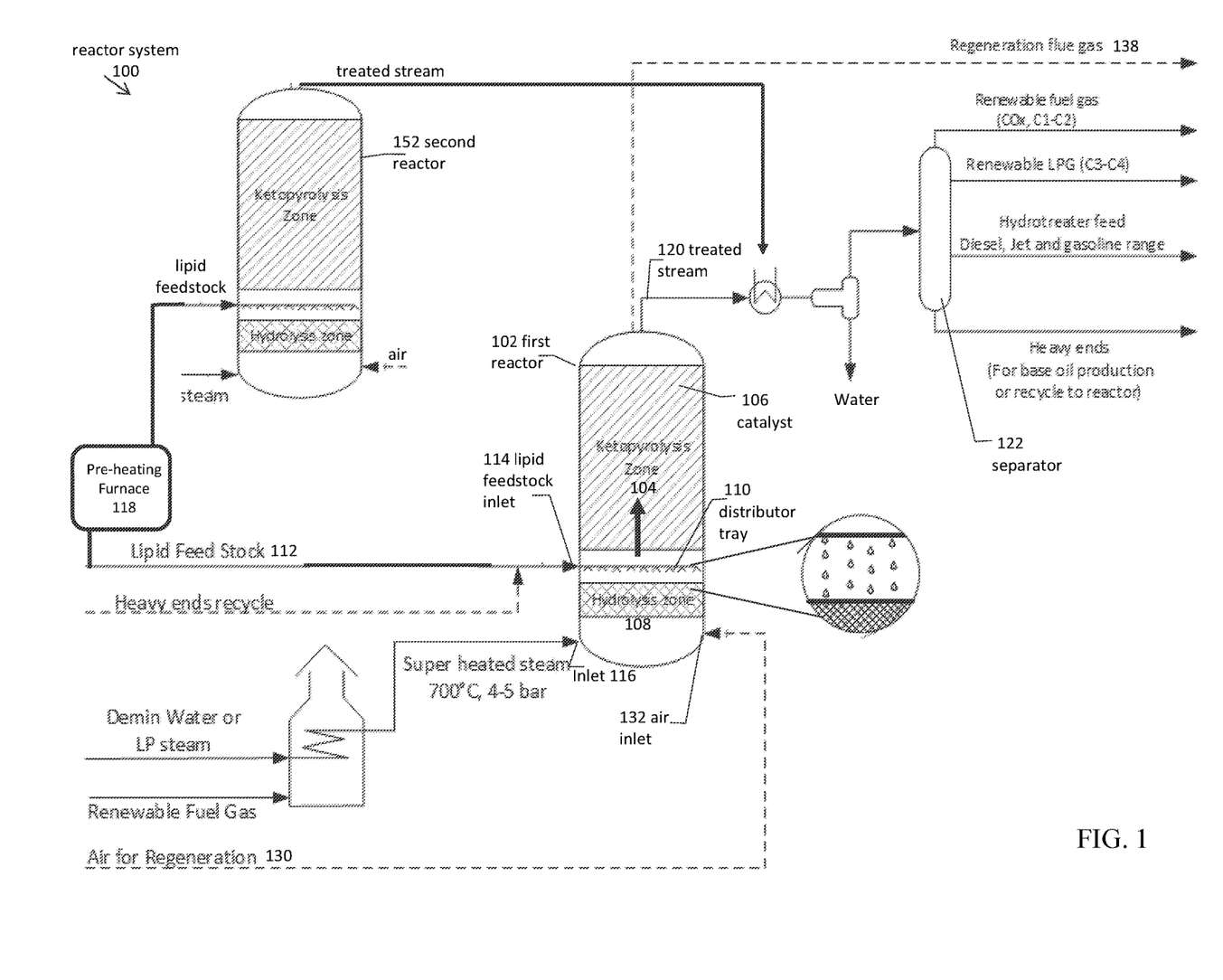
FIG. 1 illustrates components of a reactor system in accordance with an example embodiment of the disclosure.

FIG. 1 illustrates one example reactor system in accordance with embodiments of the present disclosure. It should be understood that the example embodiments described herein can be applied to other types of reactor systems as well.

FIG. 1 illustrates certain components associated with a reactor system 100. Reactor system 100 can be used to treat a lipid feedstock and produce a bio-oil renewable feedstock that is suitable for processing in a refinery for the ultimate production of transportation fuels. The reactor system 100 comprises a fixed bed reactor 102 that is an adiabatic upflow reactor. The fixed bed reactor 102 comprises at least one reaction zone, which can be referred to as a ketopyrolysis zone 104, consistent with the previous discussion of ketopyrolysis. In alternate embodiments, the reactor can comprise multiple distinct ketopyrolysis zones. The ketopyrolysis zone 104 comprises metal oxide catalyst 106 consistent with the example metal oxide catalysts described previously. Below the one or more ketopyrolysis zones and disposed adjacent the bottom of the reactor 102 is a non-volatile capture zone, which can be referred to as a hydrolysis zone 108. Disposed above the hydrolysis zone 108 and below the one or more ketopyrolysis zones 104 are a lipid feedstock inlet 114 and a distributor tray 110 that distributes a lipid feedstock 112 in droplets across the fixed bed reactor 102. Below the hydrolysis zone 108 is a superheated steam inlet 116 that provides superheated steam to the fixed bed reactor 102.

The fixed bed reactor 102 can operate alternately in a reaction mode and in a regeneration mode. When operating in the reaction mode, the lipid feedstock 112 flows into the fixed bed reactor 102 and is treated with the metal oxide catalyst 106, producing a treated stream 120 that is emitted from an outlet proximate to the top of the fixed bed reactor 102. Over time, the reaction occurring in the ketopyrolysis zone 104 causes coke to build up on the metal oxide catalyst 106. The coke should be periodically removed from the metal oxide catalyst 106 in order for the fixed bed reactor to operate properly.

Accordingly, during certain times, the fixed bed reactor 102 is switched from the reaction mode to the regeneration mode. During the regeneration mode, the lipid feedstock inlet 114 and the superheated steam inlet 116 are turned off so that the lipid feedstock 112 and the superheated steam do not flow into the fixed bed reactor 102. Additionally, during the regeneration mode, an air inlet 132 located proximate the bottom of the fixed bed reactor provides air to the fixed bed reactor 102 stimulating a combustion process within the ketopyrolysis zone 104. As one example, the air flow 130 can be at a rate of about 365 m$^3$/hr. As the air flows through the fixed bed reactor 102, combustion occurs within the ketopyrolysis zone 104 which burns the coke from the metal oxide catalyst 106 thereby regenerating the metal oxide catalyst 106. In certain embodiments, fuel can be added to the air flow to increase the combustion within the ketopyrolysis zone 104. A regeneration flue gas 138 produced by the regeneration process can be emitted from a flue gas outlet located proximate the top of the fixed bed reactor 102.

Once the metal oxide catalyst 106 has been regenerated, the fixed bed reactor 102 is switched from regeneration mode to reaction mode. Upon switching from regeneration mode to reaction mode, the air flow 130 is turned off and the lipid feedstock flow and the superheated steam flow into the fixed bed reactor 102 are turned back on for treating the lipid feedstock with the metal oxide catalyst 106.

While not required, as illustrated in FIG. 1, the reactor system 100 can include a second fixed bed reactor 152 that is similar to the fixed bed reactor 102 and that can operate in alternating reaction mode and regeneration mode. As with the fixed bed reactor 102, the second fixed bed reactor 152 can include a second ketopyrolysis zone with metal oxide catalyst, a second hydrolysis zone, a second lipid feedstock inlet, and a second superheated steam inlet. The second fixed bed reactor 152 can receive a second lipid feedstock and a second superheated steam stream and treat the second lipid feedstock during a reaction mode thereby producing a second treated stream similar to the treated stream 120 produced from fixed bed reactor. When coke accumulates on the metal oxide catalyst in the second fixed bed reactor 152, the second fixed bed reactor can switch to regeneration mode. As with the fixed bed reactor 102, when the second fixed bed reactor 152 operates in regeneration mode, the second lipid feedstock and second superheated steam flows are turned off, an airflow is turned on, and combustion occurs within the reactor to burn coke from the metal oxide catalyst thereby regenerating the catalyst.

The coupling of the fixed bed reactor 102 and the second fixed bed reactor 152 in the reactor system 100 allows the two reactors to operate in an alternating manner so that the reactor system has one reactor operating in reaction mode while the other reactor operates in regeneration mode. By operating in this alternating manner, the reactor system can continually produce a treated stream from one of the two fixed bed reactors.

Further details will now be described in connection with the operation of the fixed bed reactor 102 of reactor system 100. These further details also apply to the analogous operation of the second fixed bed reactor 152. The fixed bed reactor 102 is typically generally cylindrical in shape and can have various dimensions. A lipid feedstock 112 is directed into the fixed bed reactor 102 at the lipid feedstock inlet 114. Optionally, the lipid feedstock 112 can be heated in a pre-heating furnace 118 before entering the fixed bed reactor 102. As an additional option, before introduction into the reactors, the lipid feedstock can be filtered, for example by a mechanical filter, to remove insoluble solids that may interfere with the ketopyrolysis reactions. In one example as illustrated in FIG. 1, the lipid feedstock inlet 106 can be located along a side of the fixed bed reactor 102 above the hydrolysis zone 108 and below the ketopyrolysis zone 104. As the lipid feedstock 112 enters the reactor at the lipid feedstock inlet 114, a distributor tray 110 can distribute the lipid feedstock 112 across the diameter of the fixed bed reactor 102.

As the lipid feedstock enters the fixed bed reactor 102 and is distributed by the distributor tray 110, superheated steam entering at superheated steam inlet 116 rises through the hydrolysis zone 108 and reacts with the lipid feedstock producing an intermediate lipid gas. Non-volatile components of the lipid feedstock will flow downward and accumulate in the hydrolysis zone 108 while the intermediate lipid gas continues to flow upward into the ketopyrolysis zone 104 where it reacts with the metal oxide catalyst 106. In some example embodiments, one or more of carbon dioxide, nitrogen, and/or light hydrocarbons can be combined with the superheated steam.

In alternative example embodiments, the lipid feedstock 112 can be premixed with a steam stream prior to entering the reactor 102 through the lipid feedstock inlet 114. As representative examples of the premix approach, the lipid feedstock comprises a 50 wt. % vapor and 50 wt. % liquid mixture that flows into the fixed bed reactor 102 at a rate of 10,000 bpd (60,750 kg/h), while the steam stream flows into the fixed bed reactor 102 at a rate of 30.375 kg/h. The resulting lipid steam mixture flowing into the fixed bed reactor is in a ratio of steam wt. % to lipid wt. % of 0.5 to 1 with a feed temperature of 485° C. and a pressure of 100 psig. The foregoing values for the feed rates, relative proportions, temperature, and pressure are simply representative examples and alternate embodiments encompass ranges of plus or minus 50% of these values.

Referring again to the intermediate lipid gas, the treating conditions in the ketopyrolysis zone 104 are preferably a temperature in the range of 400° C. to 700° C. and a pressure in the range of 0 to 10 MPa. The metal oxide catalyst 106 reacts with the intermediate lipid gas in the ketopyrolysis zone 104 producing a treated stream 120 that is emitted proximate to the top of the fixed bed reactor 102.

When referencing the metal oxide catalyst 106 in connection with the fixed bed reactor 102, it should be understood that it includes an oxide support. Examples of metal oxides and the oxide support for the catalyst were provided above in the description of the treatment of the lipid feedstock. The metal oxide catalyst within the reactor typically has a packed density in the range of 400 to 1000 kg/m³. The catalyst particles are typically spherical or spheroid in shape having a diameter ranging from 1-3 mm. However, in other example embodiments the catalysts particles can have other dimensions and other shapes, such as a droplet shape or a pellet shape.

As provided above in the description of the lipid feedstock treatment, the reaction with the metal oxide catalyst results in a treated stream 120 that has a lower content of oxygen and impurities relative to the lipid feedstock 112 that entered the reactor 102 and a TAN of <5 mg KOH/g. As representative values, the treated stream 120 can exit the fixed bed reactor 102 at a pressure of about 50 psig and a temperature of about 485° C. The treated stream 120 can be subsequently separated in a separator 122 into several components, including: renewable fuel gas, renewable LPG, a heavy ends product, and a bio-oil renewable feedstock that is suitable for refining into a transportation fuel. As indicated in FIG. 1, the heavy ends component of the treated stream can be recycled and returned to the lipid feedstock 112.

It can be beneficial to the treatment conditions within the reactor 102 if the lipid feedstock 112 enters the reactor 102 at a temperature that is below a reaction temperature range. As one example, the lipid feedstock 112 can enter the fixed bed reactor 102 at a temperature of about 485° C. The superheated steam can enter the reactor 102 at a temperature of 700° C. thereby raising the lipid feedstock to a reaction temperature range.

Figure 2:
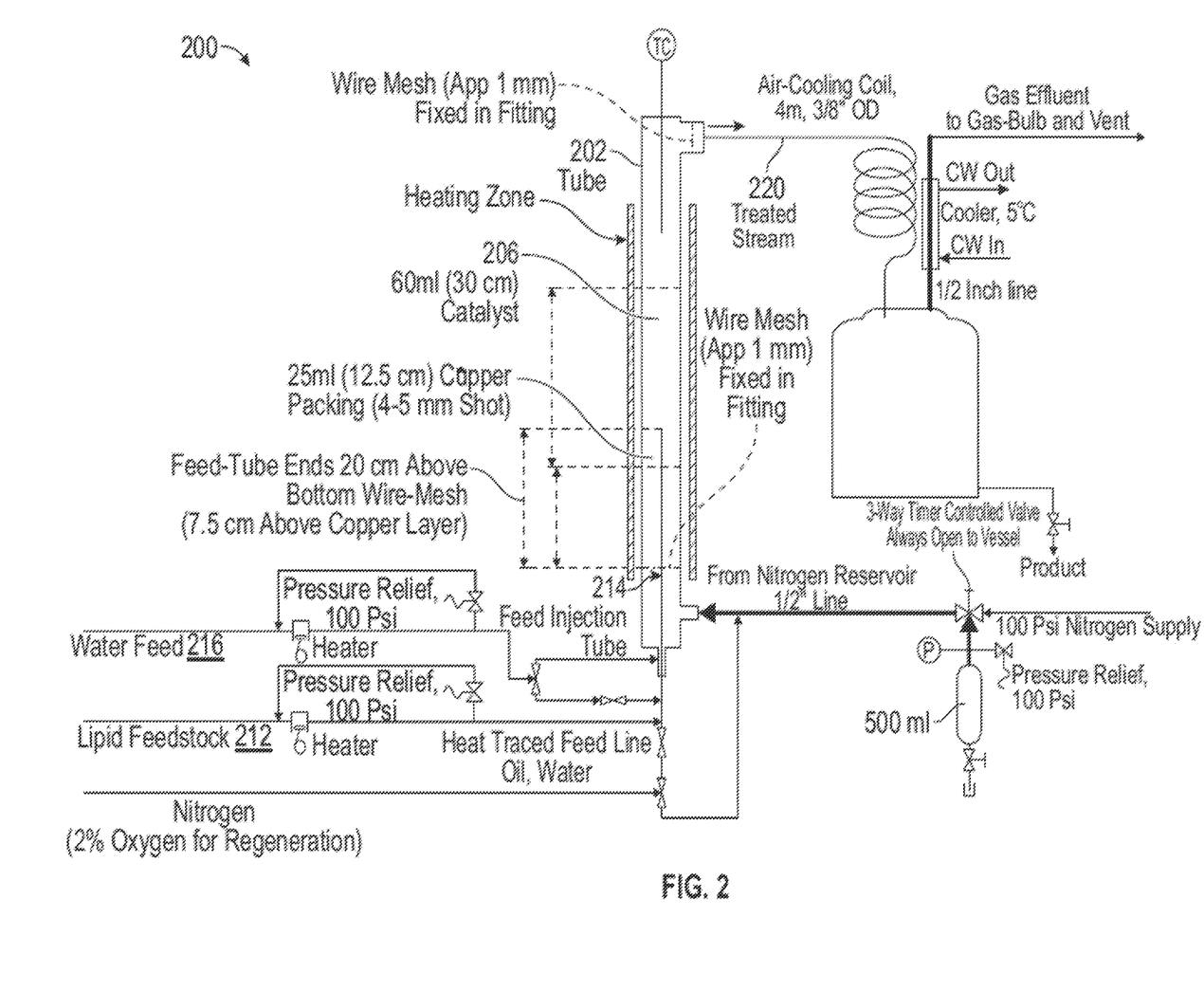
FIG. 2 illustrates an example test reactor system in accordance with an example embodiment of the disclosure.

Referring now to FIG. 2, an example reactor system 200 that was tested in a laboratory is illustrated. Although the example reactor system 200 is on a simpler and smaller scale than the reactor system 100 of FIG. 1, in testing it demonstrated the feasibility of a reactor system that uses a fixed bed reactor. As illustrated in FIG. 2, a small scale reactor was created with a tube 202 having an outer diameter of ¾ inch. The tube 202 was packed with a catalyst 206 in the form of 50 ml of 3 mm diameter calcium promoted alumina spherical pellets. The pellets were prepared by treating 3 mm alumina spherical pellets with concentrated aqueous calcium acetate to incipient wetness, drying, and calcining at 900° F. The catalyst pellets 206 within the tube 202 were supported by a support comprising wire mesh and 4-5 mm copper shot that were packed into the bottom of the tube 202. A feed injection tube 214 was inserted and extended from the bottom opening of the tube 202, up through the support of wire mesh and copper shot so that the feed injection tube 214 extended up approximately 1 inch into the layer of catalyst pellets 206. The tube 202 also was heated by a heating element wrapped around the outside of the tube 202.

During reaction mode, the lipid feedstock 212 was fed into the tube 202 at a rate of 30-50 ml/hour and the steam was fed into the tube 202 at a rate of 30-50 g/hour. The catalyst 206 within the tube 202 reacted the lipid feedstock 212 producing a treated stream 220 that was output at the top of the tube 202. After exiting tube 202, the treated stream 220 was cooled to room temperature, separated into an oil product, a water phase, and a gaseous effluent. During the laboratory testing, the reactor system 200 was operated in reaction mode for 8 hour shifts and operated in regeneration mode between the 8 hour reaction mode shifts.

In regeneration mode, the lipid and steam streams were turned off, the tube 202 was maintained at a temperature of 900° F., and a mixture of 2% oxygen in nitrogen was fed into the tube 202 at a flow rate ranging from 5 to 600 normal (standard) cc/min. Combustion during the regeneration mode removed coke from the catalyst 206. Completion of the coke combustion was confirmed by the full breakthrough of oxygen and the absence of carbon dioxide in the reactor effluent.

During the testing, a variety of lipid feedstocks were used including, 6 kg of pretreated used cooking oil, 10 kg of soybean oil, and 13 kg of untreated used cooking oil. With each type of lipid feedstock, the reactor 200 produced a treated stream with a TAN of <1 and an oxygen content substantially lower than the oxygen content of the lipid feedstock.

Figure 3:
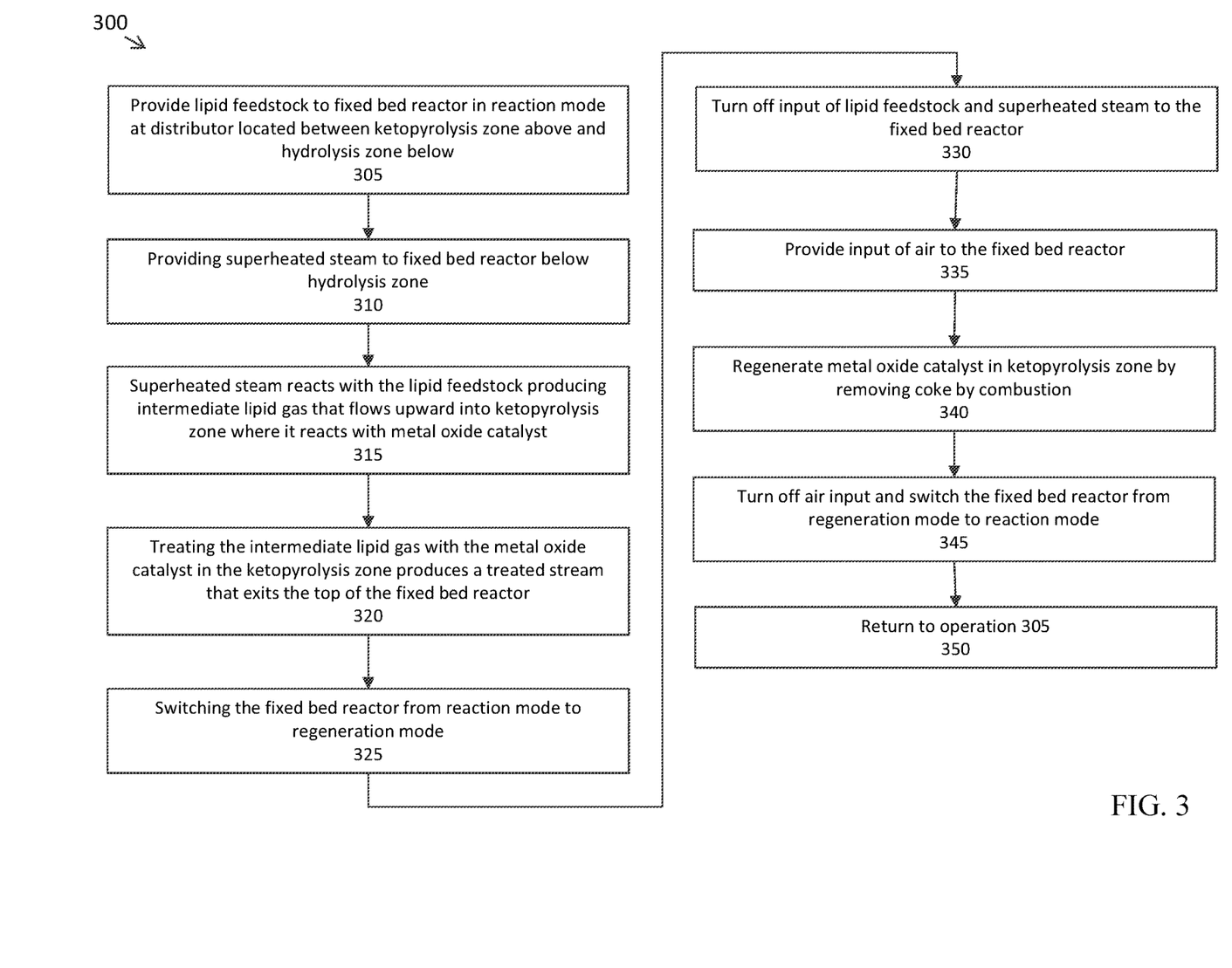
FIG. 3 illustrates a method for processing a lipid feedstock in accordance with an example embodiment of the disclosure.

Referring now to FIG. 3, an example process 300 for operation of a reactor system is illustrated. The operations of example process 300 can correspond to the example reactor system 100 of FIG. 1 or to a different example reactor system within the scope of this disclosure. The operations of example process 300 are illustrative examples and in other embodiments the operations of process 300 can be modified.

Referring to operation 305 of process 300, a lipid feedstock is provided to a fixed bed reactor comprising a hydrolysis zone and a ketopyrolysis zone that includes a metal oxide catalyst. The lipid feedstock can be input at a distributor tray located above the hydrolysis zone and below the ketopyrolysis zone. Non-volatile components of the lipid feedstock will accumulate in the hydrolysis zone.

In operation 310, superheated steam is provided to the fixed bed reactor at a steam inlet located below the hydrolysis zone. In operation 315, the superheated steam rises through the hydrolysis zone and reacts with the lipid feedstock producing an intermediate lipid gas. The intermediate lipid gas flows upward through the ketopyrolysis zone reacting with the metal oxide catalyst in operation 320. The treating conditions within the ketopyrolysis zone, such as those treating conditions described previously, produce a treated stream. The treated stream can be removed from the moving bed reactor and condensed to obtain a bio-oil renewable feedstock that is suitable for refining into a transportation fuel.

In certain embodiments, the treated stream can also comprise a renewable fuel gas, renewable LPG, and a "heavy ends" product having a boiling point greater than 360° C., which is too high to be used as a transportation fuel. This heavy ends product of the treated stream can be used: a) in the production of renewable base oil for lubricants applications, b) in a hydrocracker where it is processed into a product with a boiling temperature in the transportation fuel range, or c) it can be recycled and returned with the lipid feedstock to the fixed bed reactor where it will be thermally cracked into additional fuel range products.

After a period of time operating in reaction mode, coke accumulates on the metal oxide catalyst inhibiting treatment of the lipid feedstock. In operation 325, the fixed bed reactor is switched from reaction mode to regeneration mode in order to remove the coke thereby regenerating the metal oxide catalyst. Once the reactor is switched to regeneration mode, the flows of the lipid feedstock and the superheated steam to the reactor are turned off in operation 330. In operation 335, a flow of air is provided to the reactor to facilitate combustion and, in operation 340, the combustion process removes the coke thereby regenerating the metal oxide catalyst.

When the combustion of the coke is complete, the air flow to the reactor is turned off and the reactor is switched from regeneration mode back to reaction mode in operation 345. In operation 350, the reactor can resume the reaction mode operations beginning again with operation 305.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation unless so indicated by the context, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a", "an", and "the" are intended to include plural alternatives, e.g., at least one. The terms "including", "with", and "having", as used herein, are defined as comprising (i.e., open language), unless specified otherwise.

When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A process comprising:
    providing an input of a lipid feedstock comprising at least one fatty acid glycerol ester into a fixed bed reactor operating in a reaction mode, wherein the fixed bed reactor comprises a ketopyrolysis zone disposed above a hydrolysis zone, wherein the ketopyrolysis zone comprises a metal oxide catalyst on an oxide support, and wherein the lipid feedstock enters the fixed bed reactor between the ketopyrolysis zone and the hydrolysis zone;
    providing an input of a superheated steam into the fixed bed reactor, wherein the superheated steam enters the fixed bed reactor below the hydrolysis zone, wherein the superheated steam reacts with the lipid feedstock producing an intermediate lipid gas that flows upward through the ketopyrolysis zone;
    treating the intermediate lipid gas with the metal oxide catalyst in the ketopyrolysis zone under treating conditions to produce a treated stream that is output from the fixed bed reactor;
    switching the fixed bed reactor from the reaction mode to a regeneration mode;
    turning off the input of the lipid feedstock and the input of the superheated steam to the fixed bed reactor;
    providing an input of air to the fixed bed reactor; and
    regenerating the metal oxide catalyst in the ketopyrolysis zone of the fixed bed reactor by removing coke from the metal oxide catalyst using combustion.

2. The process of claim 1, further comprising:
    after regenerating the metal oxide catalyst, switching the fixed bed reactor from the regeneration mode to the reaction mode;
    turning off the input of air to the fixed bed reactor; and
    providing the input of the lipid feedstock and the superheated steam to the fixed bed reactor.

3. The process of claim 1, wherein the treating conditions in the fixed bed reactor include a temperature in a range of from 400° C. to 700° C. and a pressure in a range from 0 to 10 MPa.

4. The process of claim 1, wherein the fixed bed reactor is an adiabatic upflow reactor in which the superheated steam, the intermediate lipid gas, and the treated stream flow toward a top of the fixed bed reactor.

5. The process of claim 1, wherein nonvolatile solids from the lipid feedstock accumulate in the hydrolysis zone.

6. The process of claim 1, wherein the input of the lipid feedstock is at a temperature that is below a reaction temperature when entering the fixed bed reactor, and wherein the superheated steam raises the lipid feedstock to a reaction temperature when producing the intermediate lipid gas.

7. The process of claim 1, wherein one or more of the following are combined with the input of the superheated steam into the fixed bed reactor: carbon dioxide, nitrogen, and light hydrocarbons.

8. The process of claim 1, wherein a heavy ends hydrocarbon component of the treated stream is recycled to the input of the lipid feedstock provided to the fixed bed reactor.

9. The process of claim 1, further comprising distributing the input of the lipid feedstock with a distributor tray located within the fixed bed reactor.

10. The process of claim 1, wherein the fixed bed reactor comprises a second ketopyrolysis zone located above the ketopyrolysis zone, wherein the second ketopyrolysis zone comprises additional metal oxide catalyst for treating the lipid feedstock.

11. The process of claim 1, further comprising fractionating the treated stream after it leaves the fixed bed reactor to obtain a gaseous fraction and a liquid fraction, wherein the liquid fraction comprises a bio-oil having a lower oxygen content when compared to the lipid feedstock.

12. A reactor system comprising:
- a lipid feedstock inlet that directs a lipid feedstock comprising at least one fatty acid glycerol ester into a fixed bed reactor;
- at least one ketopyrolysis zone disposed within the fixed bed reactor, the at least one ketopyrolysis zone comprising metal oxide catalyst that transforms the lipid feedstock into a treated stream when the fixed bed reactor is operating in a reaction mode;
- a hydrolysis zone disposed within the fixed bed reactor and proximate a bottom portion of the fixed bed reactor, wherein the lipid feedstock inlet is disposed above the hydrolysis zone and below the at least one ketopyrolysis zone;
- a superheated steam inlet that directs superheated steam into the fixed bed reactor, the superheated steam inlet disposed below the hydrolysis zone;
- a treated stream outlet that directs the treated stream from the fixed bed reactor;
- an air inlet that directs air into the fixed bed reactor for regenerating the metal oxide catalyst when the fixed bed reactor is operating in a regeneration mode; and
- a flue gas outlet that directs flue gas from the fixed bed reactor, the flue gas produced during the regenerating of the metal oxide catalyst.

13. The reactor system of claim 12, wherein the lipid feedstock is treated in the fixed bed reactor under treating conditions to produce the treated stream, wherein the treating conditions in the moving bed reactor include a temperature in a range of from 400° C. to 700° C. and a pressure in a range from 0 to 10 MPa.

14. The reactor system of claim 12, wherein the superheated steam reacts with the lipid feedstock producing an intermediate lipid gas that flows upward through the ketopyrolysis zone.

15. The reactor system of claim 12, wherein, when the fixed bed reactor is operating in regeneration mode, a combustion process removes coke from the metal oxide catalyst thereby regenerating the metal oxide catalyst.

16. The reactor system of claim 12, wherein, when the fixed bed reactor is operating in the reaction mode, the lipid feedstock and the superheated steam flow into the fixed bed reactor and the air inlet is turned off preventing air from flowing into the fixed bed reactor.

17. The reactor system of claim 12, wherein, when the fixed bed reactor is operating in the regeneration mode, the air flows into the fixed bed reactor via the air inlet and the lipid feedstock inlet and the superheated steam inlet are turned off preventing the lipid feedstock and the superheated steam from flowing into the fixed bed reactor.

18. The reactor system of claim 12, wherein the treated stream comprises a gaseous fraction and a liquid fraction, wherein the liquid fraction comprises a bio-oil having a lower oxygen content when compared to the lipid feedstock.

19. The reactor system of claim 12, further comprising a second fixed bed reactor, the second fixed bed reactor comprising a ketopyrolysis zone, a hydrolysis zone, a lipid feedstock inlet located above the hydrolysis zone and below the ketopyrolysis zone, a superheated steam inlet located below the hydrolysis zone, and an air inlet located below the hydrolysis zone.

20. The reactor system of claim 19, wherein the second fixed bed reactor operates in a second reactor mode when the fixed bed reactor is operating in the regeneration mode, and wherein the second fixed bed reactor operates in a second regeneration mode when the fixed bed reactor is operating in the reaction mode.

* * * * *